April 15, 1924.　　　　　　　E. J. HIBNER　　　　　　1,490,897
　　　　　　　　　　　　　CHILD'S VEHICLE
　　　　　　　Filed Aug. 22, 1921　　　　2 Sheets-Sheet 2
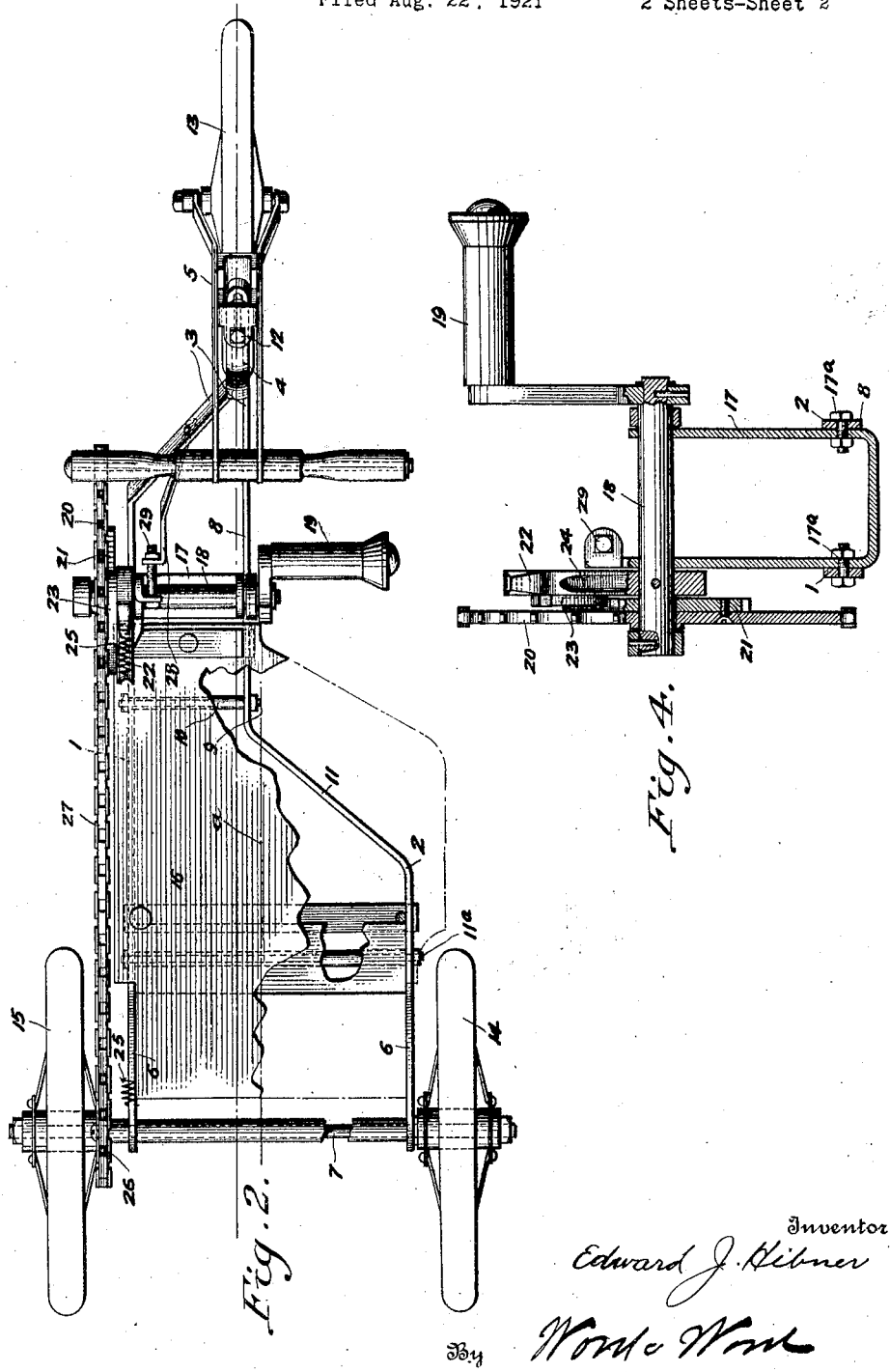
Inventor:
Edward J. Hibner Patented Apr. 15, 1924.

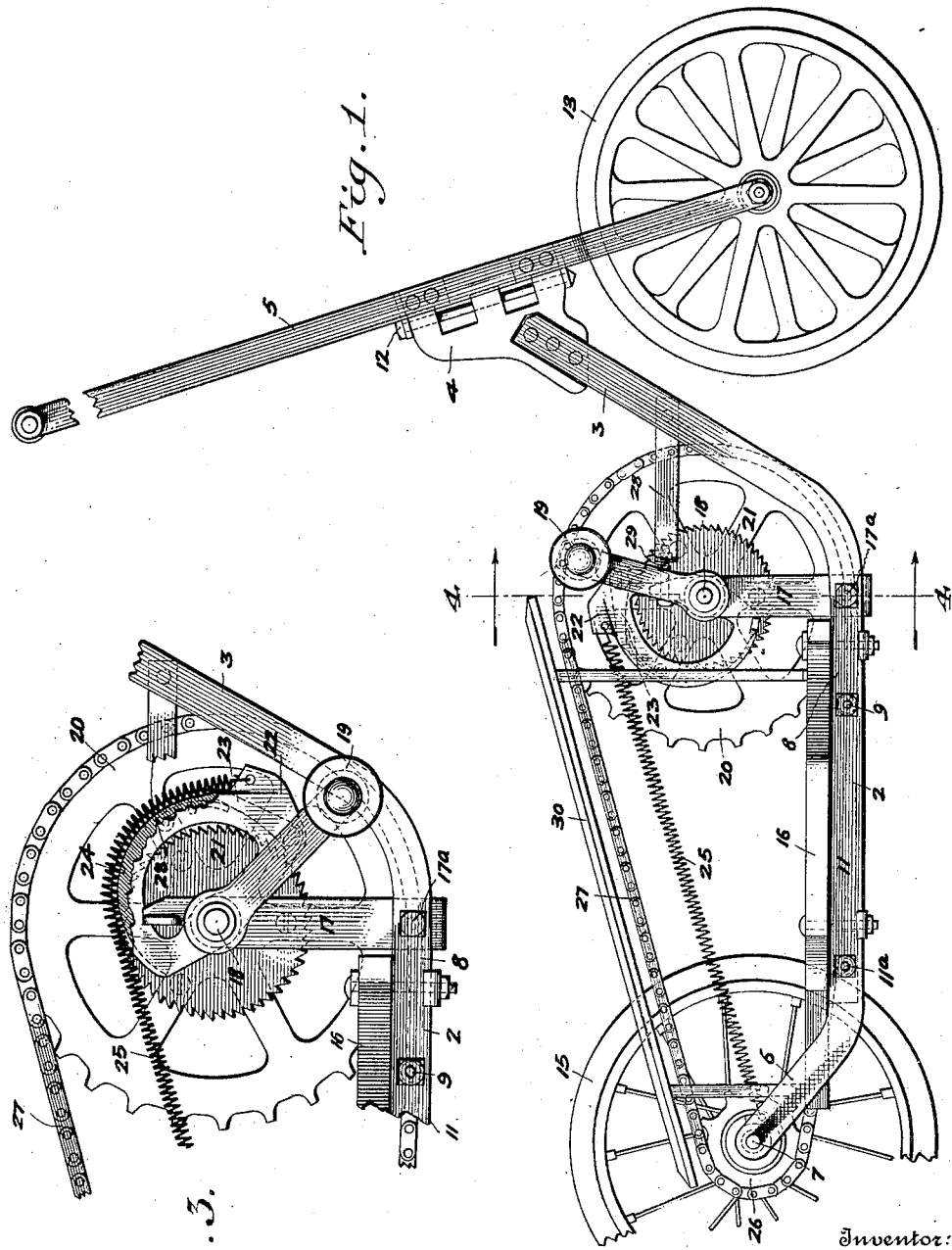

1,490,897

UNITED STATES PATENT OFFICE.

EDWARD J. HIBNER, OF HAMILTON, OHIO, ASSIGNOR TO CLARA A. HIBNER, OF NEW YORK, N. Y.

CHILD'S VEHICLE.

Application filed August 22, 1921. Serial No. 494,070.

*To all whom it may concern:*

Be it known that I, EDWARD J. HIBNER, a citizen of the United States, and residing at Hamilton, in the county of Butler and State of Ohio, have invented a new and useful Improvement in Children's Vehicles, of which the following specification is a full disclosure.

My invention relates to a vehicle plaything, in the nature of a one-pedal velocipede, for children.

An object of the invention is to provide a safe, staunch and durable structure, of easy propulsion; due to an improved driving mechanism.

Other objects of the invention relate to new frame features adapted for coordination with the particular drive.

The various features of the invention will be readily understood in relation to the description of the accompanying drawings, forming a part of this specification, wherein:

Fig. 1 is a side elevation, one rear wheel having been removed.

Fig. 2 is a top plan view.

Fig. 3 is a detail of the pedal drive.

Fig. 4 is a vertical section on line 4—4 of Fig. 1.

The frame is underslung, and comprises two steel members 1, 2, having the converging forward ends 3, which are upturned and between which is secured the swivel bracket 4, for the steering-post 5. These members 1, 2, diverge rearwardly and have upturned ends 6, for supporting the axle 7.

Preferably the members 1 and 2 have a narrowed front portion 8, braced by tie-rod 9, and spacer member 10, the said members being spread outwardly at 11, to widen the frame at the rear to axle length dimension, the members being braced by tie-rod 11ᵃ. The steering post is secured by pivot bolt 12, to bracket 4, and has the steering wheel 13. The rear axle 7 supports wheels 14, 15, the latter being the driver. This steering wheel, by this frame formation, is positioned at the left of the line *a* longitudinally medial of the axle 7, so that the weight of the operator will be close to the center of gravity of the structure, preventing twisting strains and providing a safe balance, the operator resting upon the left foot and operating the pedal with the right foot.

Upon the underslung frame portion is secured a driving platform 16, which is wide and firm, and which will not become unbalanced by the weight of the driver.

Pivotally supported between the forward forks of the frame members 1, 2, and in front of the platform, is an upstanding U-frame 17, pivoted at 17ᵃ to the members 1 and 2, upon the arms of which is journaled the pedal shaft 18, having the pedal 19 on the right hand side. Loosely journaled on the other end of shaft 18 is a sprocket wheel 20 and ratchet wheel 21 unitarily mounted and free to turn upon shaft 18. Between the ratchet wheel and the shaft bearing is a pawl supporting segment 22 fixed to said shaft, and carrying the spring-pressed pawl 23, positioned for engaging and disengaging the ratchet appropriately as the pedal is oscillated.

Preferably the member 22 is segmental, providing a grooved eccentric peripheral portion 24, for the normalizing coil spring 25, attached at the rear to the frame member 1 and at the front to said segment member 22, so as to track into said groove preserving alignment when the pedal is operated. The rear driving wheel mounted to rotate upon the rear axle, has a sprocket pinion 26 attached thereto, connected with the driving sprocket 20 by chain 27.

An adjusting abutment 28 is secured to the upturned front frame members, extending rearwardly, and terminating adjacent one limb of said U-frame, to which it is connected by adjusting screw 29, the tightening or loosening of which determines the tension of the sprocket chain.

Preferably I provide guard 30, for the sprocket chain suitably supported on the platform. The pedal will give an easy propulsion stroke, and will automatically be returned to its initial position, thus enabling an acceleration of speed under the influence of momentum. The efficient and safe distribution of the driver's weight herein provided, adds an element of safety, and enables an efficient and direct application of the driving force.

The simplicity, safety, and efficiency of the vehicle make it an admirable plaything. It is speedy, light and attractive in appearance.

Various detail departures are, of course, possible and might readily constitute equivalent embodiments of the invention herein disclosed.

Having described my invention, I claim:

1. A vehicle plaything, comprising an underslung frame, a driving platform thereon, a steering post and a steering wheel at the front end, two rear wheels and axle supported by the rear end of said frame, a U-frame pivoted at the base to the main frame in front of the platform, a pedal shaft journaled in the ends of said U-frame, a pedal therefor, a sprocket and ratchet wheel member loose on said shaft, a pawl supporting member fixed to said shaft, a sprocket chain from said sprocket to the rear traction wheel, a spring for automatically returning the pawl member, and means adjustably connecting the front end of the U-frame to the main frame for regulating the sprocket chain tension.

2. A vehicle plaything, comprising an underslung frame, a driving platform thereon, a steering post and wheel pivotally secured to the front end of the frame, an axle and rear wheels supported by rear ends of said frame, a journal member on the front end of said frame, a pedal shaft journaled therein above the plane on the platform, a pedal, a ratchet and sprocket wheel member loose on said shaft, a sprocket chain connecting said wheel with a rear traction wheel, a pawl supporting segment fixed to said pedal shaft providing a grooved periphery, a coil spring secured at the rear end to the structure, its front end being attached to the pawl member and tracking into the peripheral groove thereof.

3. A vehicle plaything, comprising an underslung frame, a driving platform thereon, a steering post and wheel secured to the front end of the frame, an axle and two wheels secured to the rear end of the frame, a U-frame pivoted at its base to the frame in front of the platform, a pedal shaft journaled in the free ends thereof, a pedal, a sprocket and ratchet wheel member loose on said shaft, a pawl supporting member fixed to said shaft and formed with a grooved periphery, a sprocket chain connecting said sprocket wheel to the rear traction wheel, a coil spring connecting the frame to said pawl supporting member and tracking into said peripheral groove when the pedal is actuated, and means adjustably connecting a front portion of the frame to the free end of said U-frame for regulating the sprocket chain tension.

4. A vehicle plaything, comprising two metal members having converging upturned front ends, and diverging upturned rear ends, a steering post and wheel pivotally mounted between the upturned front ends, an axle and two wheels supported in the said upturned rear ends, a platform on the underslung portion of said frame, a journal member secured to the frame in front of the platform, a pedal shaft and pedal journaled therein, a sprocket and ratchet wheel member loose on the shaft, a pawl member fixed to the shaft, a sprocket chain from said sprocket wheel operating a rear traction wheel, a coil spring for normalizing the pawl spring member, the converging upturned front frame portion being disposed substantially to the driving side of a line longitudinally medial to the rear axle, providing a gravity stabilization for the weight of the driver.

5. A vehicle plaything, comprising frame members having diverging upturned rear ends, and converging upturned front ends disposed approximately at one side of the medial longitudinal line of the frame, a steering wheel and post supported by said front end, a rear axle and wheels supported by said rear ends, a driver's platform on the underslung frame portion, a U-frame member pivoted at its base to the frame in front of the platform, a pedal shaft journaled in the upper end of said frame, a pedal for said shaft, a sprocket and ratchet wheel member loose on said shaft, a pawl supporting member fixed on said shaft and having a grooved periphery, a sprocket chain connecting said chain to the rear traction wheel, a coil spring connecting said pawl member to the fixed portion of the structure and tracking into said groove when the pedal is actuated, and means for adjusting said U-frame in relation to its pivotal support for adjusting the sprocket chain tension.

6. A plaything vehicle, comprising two frame members having upturned front and rear ends, providing an underslung frame, a driver's platform thereon, said rear ends diverging, an axle and wheels mounted thereon, said front ends converging, and one of said members being deflected laterally, a small block secured between said front ends, a steering post and wheel supported by said block, whereby the steering post is positioned upon one side of the longitudinal medial line of the platform, a member on the frame in front of the platform, a pedal shaft and pedal journaled therein above the platform, a ratchet wheel and sprocket member loose on said shaft, a pawl member fixed on said shaft, a chain connecting a rear tractor wheel with said sprocket wheel, and a spring for returning the pawl.

7. A three wheeled propelling vehicle, having two rear wheels and a front steering wheel, a steering handle post journaling said front steering wheel and inclined rearwardly, a platform frame journaling said rear wheels and hingedly connecting with the steering post, and a frame pivoted forwardly of said platform to said platform frame, having a treadle shaft at its upper end, a sprocket wheel on said treadle shaft at one side having transmission connection with one of said rear wheels, and a pedal at the opposite side.

8. A three-wheel vehicle, having a frame, two rear wheels, one a tractor wheel having a sprocket attached thereto, and a front steering wheel, said steering wheel offset relative to a medial line passing between said rear wheels, propelling means pivotally mounted upon said frame comprising a pivoted frame, a shaft at the top thereof, a sprocket wheel on said shaft in driving connection with the sprocket wheel of said tractor wheel, a crank and pedal at the opposite end of said shaft, and at the non-tractor side of said vehicle, whereby said vehicle may be propelled from the non-traction side of the vehicle while the weight of the operator is sustained on the traction side, and whereby interference is prevented between the transmission connections and the operating foot of the user.

9. A three wheeled propelling vehicle, having two rear wheels and a front steering wheel, a steering handle post journaling said front steering wheel, a platform frame journaling said rear wheels and hingedly connecting with said steering post, and having its platform below the plane of the axes of the wheels, a pivoted bearing at the forward end of the platform, a treadle carrying oscillating crank shaft journaled in said bearing, pawl and ratchet mechanism actuated by said crank shaft, chain and gear transmission means operatively connecting said pawl and ratchet mechanism and one of said rear wheels, and means for adjustably swinging said bearing for regulating the chain tension.

In witness whereof, I hereunto subscribe my name, as attested by the two subscribing witnesses.

EDWARD J. HIBNER.

Witnesses:
L. A. BECK,
N. M. SCHMIDT.